A. SONSTHAGEN.
CHOCOLATE AND LIKE COATING MACHINE.
APPLICATION FILED NOV. 4, 1920.
1,391,914.
Patented Sept. 27, 1921.
2 SHEETS—SHEET 2.
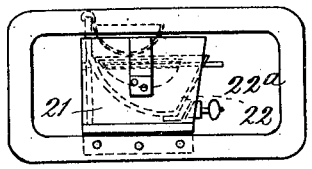
Fig. 3.
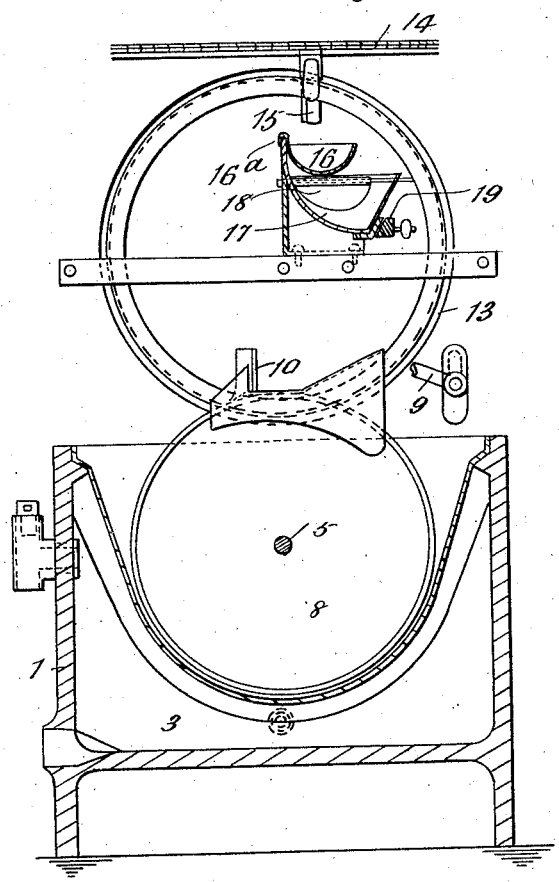
Witnesses:
Inventor:
Asbjorn Sonsthagen,
By his Att'y,

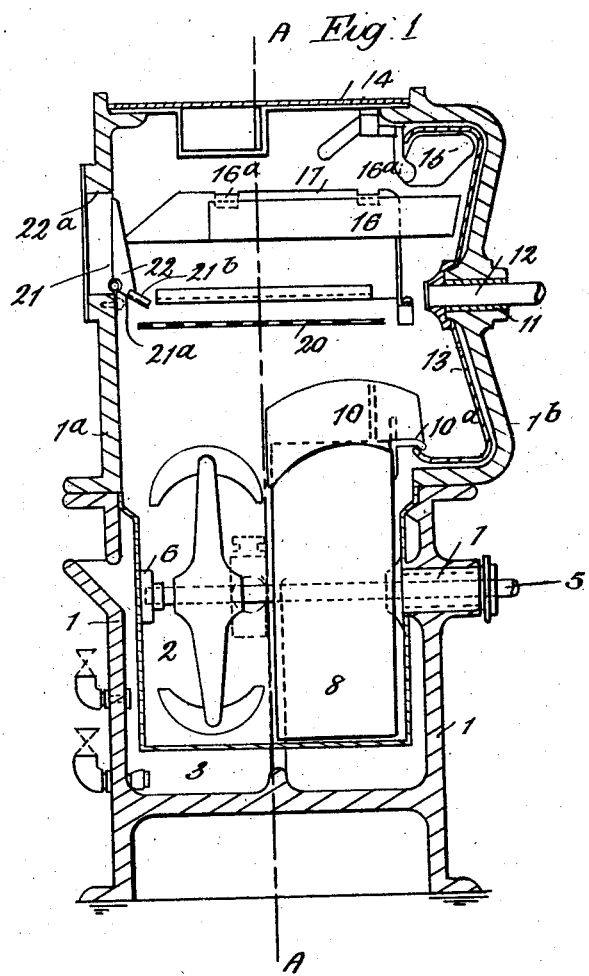

UNITED STATES PATENT OFFICE.

ASBJORN SONSTHAGEN, OF ESSEX, ENGLAND.

CHOCOLATE AND LIKE COATING MACHINE.

1,391,914.   Specification of Letters Patent.   Patented Sept. 27, 1921.

Application filed November 4, 1920. Serial No. 421,805.

*To all whom it may concern:*

Be it known that I, ASBJORN SONSTHAGEN, a subject of the King of Norway, residing in Essex, England, have invented certain new and useful Improvements in and Relating to Chocolate and like Coating Machines, of which the following is a specification.

This invention relates to improvements in and relating to chocolate and like coating machine and it refers to machines of the so called "Enrober" type in which the sweetmeat cores or other articles to be coated are passed through a stream of the coating material.

In machines of the type referred to the coating material is conveyed from the main reservoir by a rotating annular member which is disposed in a place at a right angle to the line of the band or conveyer for the articles and through which said conveyer passes. A reservoir is provided to which the material is supplied by scrapers which remove the material from the aforesaid annular conveyer and pass it to the reservoir from which it falls in a stream on to the articles on the aforesaid band or conveyer, and thence back into the main reservoir.

With machines such as those just referred to, obviously the capacity of the machine is limited by the diameter of the annular feeding member, the diameter of which determines the width of the band or conveyer for the articles, and which diameter cannot advantageously exceed certain limits.

With machines of the type referred to, moreover, as at present constructed in order to permit the contents of the main reservoir to be removed an opening is formed through the water jacket for the discharge of the said contents.

The present invention has for its primary object to provide improved means for feeding the material from the main reservoir by means of which the aforesaid annular conveyer may be dispensed with. The invention has for its further object to provide means whereby the emptying of the main reservoir may be readily effected at a point more or less remote therefrom.

In order that the invention may be the better understood drawings are appended in which:—

Figure 1 is a transverse section of a machine embodying the present invention.

Fig. 2 is a sectional view taken on lines A A.

Fig. 3 is a view showing the door through which the material is discharged when emptying the main chocolate receptacle.

Referring to the accompanying drawings upon which only such parts are shown as are essential to the proper understanding of the invention, 1 indicates the main frame of the machine, 2 the main receptacle for the chocolate provided with a steam or water jacket 3 whereby the contents of the receptacle 2 are kept at the desired temperature, a stirrer being disposed within receptacle 2, said stirrer being mounted upon shaft 5. The shaft 5 is supported at one end in a bearing 6 secured to the wall of the receptacle and passes through the other wall to the exterior of the machine a bearing 7 being provided for its support.

Motion is supplied to the shaft 5 in any convenient manner.

Secured to shaft 6 is a drum 8 dipping into the contents of receptacle 2 whereby as the shaft 6 is rotated the periphery of drum 8 becomes thickly coated with the chocolate. Secured in any suitable manner with the frame of the machine, for example by means of stays such as 9 adjustably fixed to said frame, is a scraper 10, disposed at an angle transversely of drum 8 and by means of which the liquid chocolate upon the periphery of said drum is removed and directed toward the outer edge of said drum.

1$^a$ indicates the upper member of the frame 1 bolted or otherwise secured to the lower member 1 by the flange 1$^c$ formed upon the meeting edges respectively of the parts 1 and 1$^a$. The part 1$^a$ is shaped or chambered as shown at 1$^b$ a bearing being provided at 11 for a spindle 12 driven in any suitable manner and to which spindle there is secured a circular body 13 rotating in the vertical plane and which body has a substantially trough shaped periphery into which the material removed by the scraper 10 is discharged, the scraper 10 having a lip or extension 10$^a$ the end of which is bent downward so as to project into the said trough shaped periphery of body 13 and insure the passage of the chocolate thereto. Secured in any suitable manner from the plate 14 at the top of frame 1$^a$ is a second scraper 15, the blade of which projects into the aforesaid body 10 at the uppermost point of its periphery and by which scraper the chocolate is removed and falls into a perforated trough shaped receptacle 16 provided at one side with hook shaped extremities 16ᵃ designed to engage the upper edge of one side of a trough 17 whereby the receptacle is supported. The trough 17 into which the chocolate passes after being strained to remove any lumps by a strainer 18 is supported from the cross bar 19 the receptacle 16 acting to distribute the chocolate so that it flows in a substantially even stream extending the full width of the conveyer 20 upon which the cores to be treated are placed.

The trough 17 is closed at the end adjacent the scraper 15 by a fixed wall and at the other end the escape of the chocolate from the said trough is prevented by means of the hinged plate 21 equal in width to the full width of the said trough and having sides 22 adapted, when the said plate is in the position shown in Fig. 1, to lie on each side of said trough.

Plate 21 is provided at 21ᵃ with an inwardly projecting portion inclined inwardly somewhat below the horizontal plane and weighted at 21ᵇ so that when in the position shown in Fig. 1 the plate will not readily yield to the pressure of the material within the trough. When it is desired to remove the chocolate from the machine the plate 21 is turned outwardly and downwardly and then forms a chute through which the liquid chocolate flows and may be collected in a suitable receptacle the machine being kept in operation until the receptacle 2 is emptied. Access to the plate 21 is obtained through an opening 22ᵃ formed on the side wall of the part 1ᵃ of frame 1 for which a suitable closure, not shown, is provided.

In order to increase the carrying efficiency of the drum 8 or body 13, for example when dealing with a thin or only slightly viscid liquid, the surfaces of the said drum and body may be ribbed, roughened or otherwise treated to assist in retaining the said liquid.

Claims.

1. In combination, a rotatable member comprising an annular part having an inner face; adapted to receive material thereon; a horizontal conveyer disposed away from over said face; and means whereby said conveyer is adapted for receiving material from said face.

2. In combination, a reservoir; a rotatable member having an annular flange having an inner face; means for transferring material from the reservoir to said inner face; a second means for removing said material from said member; and a horizontal conveyer moving in a path parallel to the plane of said member and entirely to one side of said plane and transverse to the axis of said member and disposed to one side of said member a distance substantially as great as the diameter of said member.

3. In combination, a rotatable member comprising a disk portion provided with a peripheral flange substantially at a right angle to the plane of the disk portion and having an inner face; means for transferring material to said inner face; a second means for removing said material from the upper part of said face; and a horizontal conveyer receiving material from said second means.

4. In combination, a rotatable annular member having an inner face; means for transferring material to said inner face; a second means for removing said material from said face; and a horizontal conveyer moving in a path transverse to the axis of said member.

5. In combination, a reservoir; a rotatable shaft in said reservoir; a second rotatable shaft; a mixing device and a rotatable drum member on said shaft; a rotatable member having an annular flange having an inner face; means for transferring material from the drum member to said inner face; a second means for removing said material from said member; and a horizontal conveyer receiving material from said second means and disposed over said device, drum member and reservoir and away from over said flange.

6. In combination, a rotatable member having an annular flange having an inner face; means for transferring material to said inner face; a scraper for removing the material from the upper portion of said inner face; a strainer extending a distance at a right angle to said plane of the disk substantially equal to the diameter of the disk and receiving material from said second scraper; an elongated perforated receptacle below said strainer parallel thereto; and a horizontal conveyer moving transverse to the receptacle and receiving material from said receptacle and disposed over said reservoir and away from over said flange.

7. In combination, a reservoir; a rotatable member having an annular flange having an inner face; means for transferring material from the reservoir to said inner face; a second means for removing said material from said member; and a horizontal conveyer receiving material from said second means and disposed over said reservoir and away from over said flange.

8. In combination, a reservoir; a shaft; a rotatable member having a disk portion fixed on said shaft and provided with a peripheral horizontal flange substantially at a right angle to the plane of the disk portion and disposed at a higher level than said reservoir; means for transferring material from the reservoir to said inner face; a second means for removing said material from said member; and a horizontal conveyer moving in a path parallel to said plane and entirely to one side of said plane and transverse to said shaft and having a width substantially equal to the diameter of said member and disposed over said reservoir and away from over said flange and disk portion.

9. In combination, a reservoir; a rotatable shaft in said reservoir; a second rotatable shaft; a mixing device and a rotatable drum member on said shaft; a second rotatable member having a disk portion fixed on said shaft and provided with a peripheral horizontal flange at a right angle to the plane of the disk portion and disposed at a higher level than said first member; a scraper for removing the material from the first member and transferring it to the inner face of said flange; a second scraper for removing the material from the upper portion of said inner face; a strainer extending a distance at a right angle to said plane of the disk equal to the diameter of the disk and receiving material from said second scraper; an elongated perforated receptacle below said strainer parallel thereto; a horizontal conveyer moving in a path parallel to said plane of said disk portion and entirely to one side of said plane and transverse to said strainer and receptacle and said first and second shafts and having a width substantially equal to the length of said reservoir, and disposed over said reservoir and away from over said flange and disk portion.

In testimony whereof I affix my signature in the presence of two witnesses.

ASBJORN SONSTHAGEN.

Witnesses:
PERCY M'COY,
J. N. EVANS JACKSON.